United States Patent
Seok et al.

(10) Patent No.: US 9,497,691 B2
(45) Date of Patent: Nov. 15, 2016

(54) COMMUNICATION METHOD IN WIRELESS LAN SYSTEM

(75) Inventors: Yong Ho Seok, Anyang-si (KR); Suh Wook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 13/992,682

(22) PCT Filed: Dec. 9, 2011

(86) PCT No.: PCT/KR2011/009509
§ 371 (c)(1),
(2), (4) Date: Jun. 7, 2013

(87) PCT Pub. No.: WO2012/078007
PCT Pub. Date: Jun. 14, 2012

(65) Prior Publication Data
US 2013/0250834 A1    Sep. 26, 2013

Related U.S. Application Data

(60) Provisional application No. 61/421,620, filed on Dec. 9, 2010, provisional application No. 61/424,676, filed on Dec. 20, 2010.

(51) Int. Cl.
| | | |
|---|---|---|
| H04W 48/16 | (2009.01) | |
| H04W 12/06 | (2009.01) | |
| H04W 52/36 | (2009.01) | |
| H04W 48/20 | (2009.01) | |
| H04W 4/00  | (2009.01) | |
| H04W 84/12 | (2009.01) | |
| H04W 48/12 | (2009.01) | |

(52) U.S. Cl.
CPC ............. *H04W 48/16* (2013.01); *H04W 12/06* (2013.01); *H04W 52/367* (2013.01); *H04W 4/005* (2013.01); *H04W 48/12* (2013.01); *H04W 48/20* (2013.01); *H04W 84/12* (2013.01)

(58) Field of Classification Search
USPC .......................................... 370/311
See application file for complete search history.

(56) References Cited

U.S. PATENT DOCUMENTS 4,905,234 A * 2/1990 Childress et al. ............ 370/349
5,627,882 A    5/1997 Chien et al.
(Continued)

FOREIGN PATENT DOCUMENTS

| KR | 10-0708204 | 4/2007 |
|---|---|---|
| KR | 10-2009-0012543 | 2/2009 |
| KR | 10-2009-0094673 | 9/2009 |

OTHER PUBLICATIONS

United States Patent and Trademark Office Application U.S. Appl. No. 13/885,559, Notice of Allowance dated Jun. 24, 2016, 12 pages.

*Primary Examiner* — Alex Skripnikov
(74) *Attorney, Agent, or Firm* — Lee, Hong, Degerman, Kang & Walmey; Jonathan Kang; Michael Monaco

(57) ABSTRACT

Provided is a communication method by a management station in a wireless communication system. The method includes: receiving, from one or more stations (STAs), at least one advertising message including information on each STA; transmitting an invitation message to a specific STA among one or more STAs; establishing a link with the specific STA; and exchanging a frame with the specific STA. The link establishment includes performing association with the specific STA in order to exchange the frame with the specific STA.

14 Claims, 11 Drawing Sheets

(56) References Cited

U.S. PATENT DOCUMENTS

| | | |
|---|---|---|
| 2006/0056348 A1* | 3/2006 | Marinier et al. .............. 370/331 |
| 2007/0147332 A1* | 6/2007 | Lappetelainen et al. ..... 370/346 |
| 2007/0297438 A1* | 12/2007 | Meylan et al. ............... 370/445 |
| 2010/0008285 A1* | 1/2010 | Kuroda ......................... 370/315 |
| 2010/0067486 A1 | 3/2010 | Masuda |
| 2011/0154084 A1* | 6/2011 | Vandwalle et al. ........... 713/324 |

* cited by examiner

COMMUNICATION METHOD IN WIRELESS LAN SYSTEM

CROSS-REFERENCE TO RELATED APPLICATIONS

This application is the National Stage filing under 35 U.S.C. 371 of International Application No. PCT/KR2011/009509, filed on Dec. 9, 2011, which claims the benefit of U.S. Provisional Application Ser. No. 61/421,620, filed on Dec. 9, 2010, and U.S. Provisional Application Ser. No. 61/424,676, filed on Dec. 20, 2010, the contents of which are all hereby incorporated by reference herein in their entirety.

TECHNICAL FIELD

The present invention relates to wireless communication, and more particularly, to a communication method by link establishment among stations (STAs) in a wireless local area network (WLAN).

BACKGROUND ART

In recent years, with the development of an information and communication technologies, various wireless communication technologies have been developed. Among them, a wireless LAN (WLAN) is a technology that can wirelessly access the Internet in a home or a company or a specific service providing region by using portable terminals such as a personal digital assistant (PDA), a laptop computer, a portable multimedia player (PMP), and the like based on a wireless frequency technology.

In order to overcome a limit for a communication speed noted as a weak point in the WLAN, IEEE 802.11n has been provided as a technological standard established comparatively recently. The IEEE 802.11n aims at increasing the speed and reliability of a network and extending an operating distance of a wireless network. In more detail, the IEEE 802.11n supports high throughput (HT) in which a data processing speed is equal to or higher than maximum 540 Mbps, and is based on a multiple inputs and multiple outputs (MIMO) technology using multiple antennas at both a transmitter and a receiver in order to minimize a transmission error and optimize a data speed.

In the STA, as the propagation of the WLAN is activated and further, an application using the WLAN is diversified, the necessity for a new WLAN system for higher throughput than a data processing speed supported by the IEEE 802.11n has come to the fore in recent years. A next-generation WLAN supporting a very high throughput (VHT) as a next version of the IEEE 802.11n WLAN system is one of IEEE 802.11 WLAN systems which have been newly proposed in recent years in order to support a data processing speed of 1 Gbps or higher in an MAC service access point (SAP).

The next-generation WLAN system supports transmission of a multi user multiple input multiple output (MU-MIMO) mode in which a plurality of non-AP STAs simultaneously access a channel in order to efficiently use the wireless channel. According to the MU-MIMO transmission mode, the AP may transmit a frame to one or more non-AP STAs which are MIMO-paired simultaneously.

Meanwhile, as the propagation of the WLAN is activated, an environment in which one AP provides a service to a lot of non-AP has been found. Moreover, as the number of mobile apparatuses that support the WLAN has increased, a method that can support increased mobility has been required.

As one example of an environment in which multiple STAs exist in one wireless LAN system, a machine to machine (M2M) network may be provided. The M2M network means a network that a machine supporting the WLAN communication sends and receives information as a principal agent, unlike the existing WLAN system in which there are a lot of cases in which humans receive services by accessing APs through STAs.

In the existing WLAN system, a flow of general communication is that an STA used by a user requests information through an AP and acquires information from the AP. In the general WLAN system, procedures for link establishment, such as scanning, authentication, and association are actively progressed through the request by the STA. The procedures are suitable for a communication flow in which the user requests information through the STA and acquires the requested information from the AP.

On the contrary, in the WLAN system that supports the M2M network, a general communication flow may be that the user requests information to a plurality of STAs associated with the AP through the AP and acquires information from each of the STAs. Under such an environment, the AP's being selectively associated with an STA that the AP will send and receive a wireless signal conforms to the aforementioned communication flow. However, when the procedures for link establishment start, it may be inappropriate for the AP to be selectively associated with the STAs. Therefore, a link establishment method which is appropriate to the M2M WLAN system is required.

DISCLOSURE

Technical Problem

The present invention has been made in an effort to provide a communication method among stations (STAs) by link establishment in a WLAN system that supports machine to machine (M2M).

Technical Solution

In an aspect, provided is a communication method by a management station in a wireless communication system. The method includes receiving, from one or more stations (STAs), at least one advertising message including information on each STA, transmitting an invitation message to a specific STA among one or more STAs, establishing a link with the specific STA and exchanging a frame with the specific STA. The step of establishing the link includes performing association with the specific STA in order to exchange the frame with the specific STA.

The association may include transmitting an association request message of requesting the association to the specific STA, and receiving an association response message as a response to the association request message from the specific STA.

The association response message may include information indicating whether the association is successfully completed.

The method may further include deciding an STA to be associated among one or more STAs based on at least one advertising message, and the STA to be associated may be the specific STA.

Each of one or more advertising messages may include an address field indicating an identification address of a corresponding STA; an STA type field indicating a device type of the corresponding STA; and a service category field indicating a service list which the corresponding STA is capable of supporting.

Each of one or more advertising messages further includes may further include a sleep interval field indicating a doze state switching period of the corresponding STA; and a listening duration field indicating an awake duration of the corresponding STA.

Each of the advertising messages may be repeatedly transmitted at a period indicated by the corresponding sleep interval field.

The invitation message may include an address field indicating an identification address of the management STA, a BSSID field indicating identification information of a basic service set (BSS) based on the management STA, a capability field indicating a supporting capability of the BSS, a power constraint field including power constraint information in the BSS, and a rate field indicating data rate supported by the BSS.

The method may further include performing authentication with the specific STA, and the authentication may include receiving an authentication response message as a response to the invitation message from the specific STA after transmitting the invitation message.

In another aspect, a wireless apparatus includes a transceiver transmitting and receiving a wireless signal and a processor operating through functional association with the transceiver. The processor is configured to receive, from one or more stations (STAs), at least one advertising message including information on each STA, transmit an invitation message to a specific STA among one or more STAs, establish a link with the specific STA, and exchange a frame with the specific STA. The link establishment may include association with the specific STA in order to exchange the frame with the specific STA.

The association with the specific STA may include transmitting an association request message of requesting the association to the specific STA; and receiving an association response message as a response to the association request message from the specific STA.

The processor may be configured to further perform deciding an STA to be associated among one or more STAs based on at least one advertising message.

The STA to be associated may be the specific STA.

Advantageous Effects

Proposed is a communication method based on a link establishment method using an access point (AP) as a principal agent in a WLAN system that supports M2M. The AP selects an STA to request association with the selected STA based on an advertising message transmitted by an STA to be associated with the AP itself. Unlike the existing link establishment method, the STA maintains an awake state in order to transmit an advertising message and an invitation message and may switch to a doze state in other sections. Therefore, power management efficiency of the STA can be increased.

The AP can select an STA which needs to be associated with the AP itself based on STA related information included in the advertising message. Therefore, an unnecessary association request by the STA is limited and efficiency of basic service set (BSS) management by the AP can be increased.

Since the AP establishes a link as a principal agent, it is possible to prevent a failure by the STA in a scanning procedure and an authentication/association procedure. Therefore, since it is possible to prevent wireless resources from being excessively occupied by the STA, efficiency of the wireless resources may be increased and an overall throughput of the WLAN system can be increased.

MODE FOR INVENTION

Figure 1:
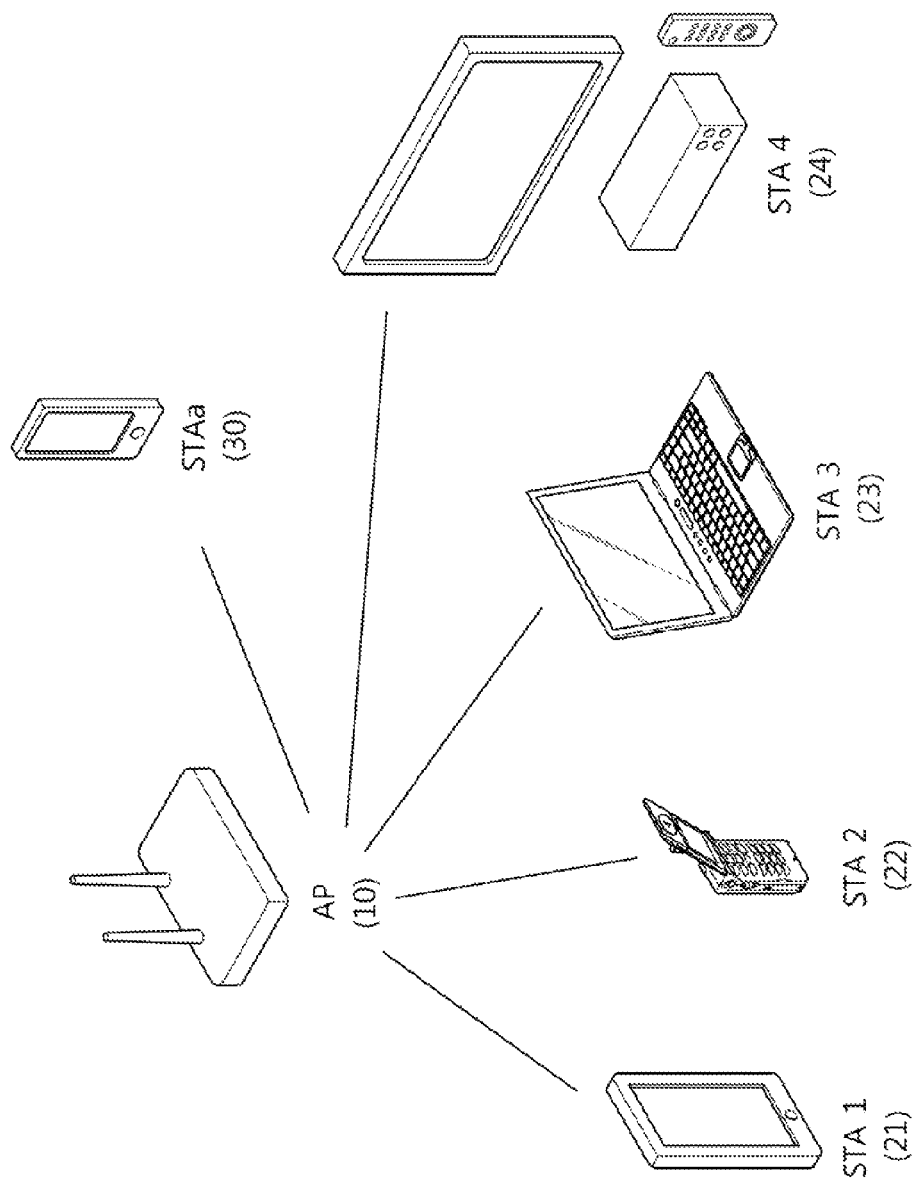
FIG. 1 is a diagram illustrating a configuration of a general wireless local area network (WLAN) system according to an exemplary embodiment of the present invention.

FIG. 1 is a diagram illustrating a configuration of a general wireless local area network (WLAN) system according to an exemplary embodiment of the present invention.

Referring to FIG. 1, the WLAN system includes one or more basic service sets (BSS). The BSS is a set of stations (STAs) that are successfully synchronized to communicate with each other and is not a concept indicating a specific region.

An infrastructure BSS includes one or more non-AP stations (a non-AP STA1 21, a non-AP STA2 22, a non-AP STA3 23, a non-AP STA4 24, and a non-AP STAa 30), an access point (AP) 10 providing a distribution service, and a distribution system (DS) connecting a plurality of APs. In the infrastructure BSS, the AP manages the non-AP STAs of the BSS.

On the contrary, an independent BSS (IBSS) is a BSS that operates in an Ad-Hoc mode. Since the IBSS does not include the AP, the IBSS has a centralized management entity that performs a management function at the center. That is, in the IBSS, the non-AP STAs are managed in a distributed manner. In the IBSS, all STAs may be formed by movable STAs and since all of the STAs are not permitted to access the DS, all of the STAs constitute a self-contained network.

The STA as a predetermined functional medium including a medium access control (MAC) that follows a regulation of an Institute of Electrical and Electronics Engineers (IEEE)

802.11 standard and a physical layer interface for a wireless medium includes both an AP and a non-AP station in a broad sense.

The non-AP STA as not the AP but the STA may be called another name such as a mobile terminal, a wireless device, a wireless transmit/receive unit (WTRU), user equipment (UE), a mobile station (MS), a mobile subscriber unit, or just a user. Hereinafter, the non-AP STA will be denoted by the STA for easy description.

The AP is a functional medium that provides a connection to the DS via a wireless medium for an STA associated to the corresponding AP. In the infrastructure BSS including the AP, the STAs principally communicate with each other via the AP, but when a direct link is set, the STAs may also directly communicate with each other. The AP may be called a central controller, a base station (BS), a node B, a base transceiver system (BTS), a site controller, or a management STA.

A plurality of infrastructure BSSs including the BSS, which is illustrated in FIG. 1 may be interconnected through the distribution system (DS). The plurality of BSSs connected through the DS is called an extended service set (ESS). The APs and/or STAs included in the ESS may communicate with each other, and in the same ESS, the STA may move from one BSS to another BSS while continuously performing communications.

In the WLAN system according to the IEEE 802.11, a basic access mechanism is a carrier sense multiple access with collision avoidance (CSMA/CA) mechanism. The CSMA/CA mechanism is called a distributed coordination function (DCF) of the IEEE 802.11 MAC and basically adopts a "listen before talk" access mechanism. According to this type of access mechanism, the AP and/or STA senses a wireless channel or medium before starting transmission. As a sensing result, when it is sensed that the medium is in an idle status, the AP and/or STA starts frame transmission through a corresponding medium. On the contrary, when it is sensed that the medium is in an occupied status, the corresponding AP and/or STA does not start its own transmission but waits by setting a delay period for medium accessing.

The CSMA/CA mechanism includes even virtual carrier sensing in addition to physical carrier sensing in which the AP and/or STA directly senses the medium. The virtual carrier sensing is used to complement problems which may occur in accessing the medium, such as a hidden node problem, and the like. The MAC of the WLAN system uses a network allocation vector (NAV) for the virtual carrier sensing. The NAV is a value in which the AP and/or STA uses the medium at present or has an authorization to use the medium instructs a time left until the medium becomes a usable status to another AP and/or STA. Therefore, the value set as the NAV corresponds to a period in which the use of the medium by the AP and/or STA that transmits the corresponding frame is scheduled.

In the wireless communication system, the existence of the network may not be found directly when the power of the STA is turned on and starts an operation thereof due to a feature of the wireless medium. Therefore, even any type of STA needs to perform a network discovery process in order to access the network. The STA that discovers the network through the network discovery process selects a network in which the STA will subscribe through a network selection process. Thereafter, the STA subscribes in the selected network to perform a data exchanging operation achieved in a transmitter/receiver.

In the WLAN system, the network discovery process is implemented by a scanning procedure. The scanning procedure is divided into passive scanning and active scanning. The passive scanning is achieved based on a beacon frame which the AP periodically broadcasts. In general, the AP of the WLAN broadcasts the beacon frame at a specific interval (for example, 100 msec). The beacon frame includes information on a BBS which the beacon frame itself manages. The STA waits for manually receiving the beacon frame in a specific channel. The STA that acquires information on the network through receiving the beacon frame terminates the scanning procedure in the specific channel. Since the manual scanning is achieved only by receiving the beacon frame without transmitting an additional frame, the manual scanning is advantageous in that whole overhead is small. However, the manual scanning is disadvantageous in that a scanning execution time is increased in proportion to a transmission period.

In the active scanning, the STA actively broadcasts a probe request frame in the specific channel to request network information from all APs that receive the broadcasted probe request frame. The APs that receive the probe request frame wait for a random time in order to prevent a frame collision and thereafter, transmits the network information included in a probe response frame to the corresponding STA. The STA acquires the network information by receiving the probe response frame to terminate the scanning procedure. The active scanning has an advantage to terminate scanning within a relatively short time. On the contrary, since a frame sequence depending on a request—a response is required, whole network overhead is increased.

The STA that terminates the scanning procedure selects the network according to a specific reference associated therewith and thereafter, performs an authentication procedure with the AP. The authentication procedure is achieved by a 2-way handshake. The STA that terminates the authentication procedure performs an association procedure with the AP.

The association procedure is achieved by the 2-way handshake. First, the STA transmits an association request frame to the AP. The association request frame includes capability information of the STA. The AP decides whether to permit the association with the corresponding STA. The AP that decides whether to permit the association transmits an association response frame to the corresponding STA. The association response frame includes information indicating whether to permit the association and information indicating a reason in permitting/failing in the association. The association response frame further includes information on a capability which the AP is capable of supporting. When the association is successfully completed, a normal frame exchange between the AP and the STA is achieved. When the association is failed, the association procedure is again tried based on information on a failure reason included in the association response frame or the STA may request the association to another AP.

In order to overcome a limit for a communication speed noted as a weak point in the WLAN, IEEE 802.11n has been provided as a technological standard established comparatively recently. The IEEE 802.11n aims at increasing the speed and reliability of the network and extending an operating distance of a wireless network. In more detail, the IEEE 802.11n supports high throughput (HT) in which a data processing speed is equal to or higher than maximum 540 Mbps, and is based on a multiple inputs and multiple outputs (MIMO) technology using multiple antennas at both a transmitter and a receiver in order to minimize a transmission error and optimize a data speed.

In the STA, as the propagation of the WLAN is activated and further, an application using the WLAN is diversified, the necessity for a new WLAN system for higher throughput than a data processing speed supported by the IEEE 802.11n has come to the fore in recent years. A next-generation WLAN supporting very high throughput (VHT) as a next version of the IEEE 802.11n WLAN system is one of IEEE 802.11 WLAN systems which have been newly proposed in recent years in order to support a data processing speed of 1 Gbps or higher in an MAC service access point (SAP).

The next-generation WLAN system supports transmission of a multi user multiple input multiple output (MU-MIMO) mode in which a plurality of STAs simultaneously access a channel in order to efficiently use the wireless channel. According to the MU-MIMO transmission mode, the AP may transmit a packet to one or more STAs which are MIMO-paired simultaneously.

A TV WS represents a frequency band which is in the idle status which remains by digitalization of an analog TV of U.S.A. and represents, for example, a band of 54 to 698 MHz. However, this is just an example and the TV WS may be a licensed band which a licensed user may preferentially use. The licensed user means a user who is licensed to use the licensed band and may be called even other names such as a licensed device, a primary user, an incumbent user, and the like.

The AP and/or STA that operates in the TV WS needs to provide a protection function for the licensed user. The reason is that the licensed user is preferred in using the TV WS band. For example, when the licensed user such as a microphone already uses a specific WS channel which is a frequency band which is divided in terms of a regulation so as to have a specific bandwidth in the TV WS band, the AP and/or STA is incapable of using a frequency band corresponding to the WS channel in order to protect the licensed user. Further, when the licensed user uses a frequency band used for frame transmission and/or reception at present, the AP and/or STA needs to stop using the corresponding frequency band.

Therefore, the AP and/or STA needs to first perform a procedure of determining whether a specific frequency band in the TV WS band is available, that is, whether the licensed user is present in the frequency band. Determining whether the licensed user is present in the specific frequency band is called spectrum sensing. As a spectrum sensing mechanism, an energy detection mode, a signature detection mode, and the like are used. When the intensity of a received signal is equal to or more than a predetermined value, it may be determined that the licensed user is using the frequency band or when a DTV preamble is detected, the licensed user is using the frequency band.

Meanwhile, with the recent advent of various communication services such as a smart grid, e-Health, and ubiquitous, a machine to machine (M2M) technology for supporting the communication services has held the limelight. Sensors sensing a temperature, humidity, and the like, home appliances such as a camera, a TV, and the like, large-sized machines such as a process machine of a factory and an automobile may be one of components constituting an M2M system. The components constituting the M2M system may transmit and receive data based on WLAN communication. When devices constituting the M2M system support the WLAN and constitute the network, the devices will be referred to as an M2M WLAN system below.

Features of the WLAN system supporting the M2M will be described below.

1) Lots of STAs: In the M2M, it is assumed that lots of STAs are present within the BSS unlike an existing network. The reason is that all of devices possessed by an individual and sensors installed in a home, a company, and the like are considered. Therefore, significantly lots of STAs may access one AP.

2) Low traffic load per each STA: Since an M2M terminal has a traffic pattern to collect and report neighboring information, the M2M terminal need not frequently transmit the neighboring information and the amount of the information is also small.

3) Uplink-centered communication: The M2M primarily has a structure to receive a command through downlink and takes an action and thereafter, report result data through uplink. Since primary data is generally transmitted through the uplink, the uplink is centered in the system supporting the M2M.

4) Power management of STA: The M2M terminal operates primarily by a battery and may be difficult for the user to frequently charge. Therefore, a power management method for minimizing battery consumption is required.

5) Automatic recovery function: Since it is hard for the human to directly handle the devices constituting the M2M system under a specific situation, a function for the devices to recover themselves is required.

The M2M is expected to be applied to the smart grid, the e-Health, factory automation, and the like. The smart grid is a next-generation electrical power network that improves the efficiency of electric power by amalgamating an existing electric power network and an IT network. The e-Health is a medical management system that observes a health status in real time by attaching sensors to a human body. The factory automation is a technology that constructs an unmanned automated system by installing a communication module in a machine of a factory.

Meanwhile, when the scanning procedure, the authentication procedure, and the association procedure depending on the link establishment method of the existing WLAN system are just applied to the M2M WLAN system, the AP may not selectively decide the STA which the AP itself will manage. As a result, the AP is incapable of managing the STA under a specific situation. In the M2M, since the AP needs to manage all operations of the STA, the AP needs to perform discovery/selection of the network as a principal agent.

In the WLAN system supporting the M2M, a function of the existing STA needs to be reduced and a management function of the AP that directly accesses the network needs to be extended. In the M2M WLAN system, since the STA is generally a low cost machine, the STA may not be operated by the user. Therefore, since the operation of the STA may be limitative, a communication protocol performed by the STA needs to be reduced.

Figure 2:
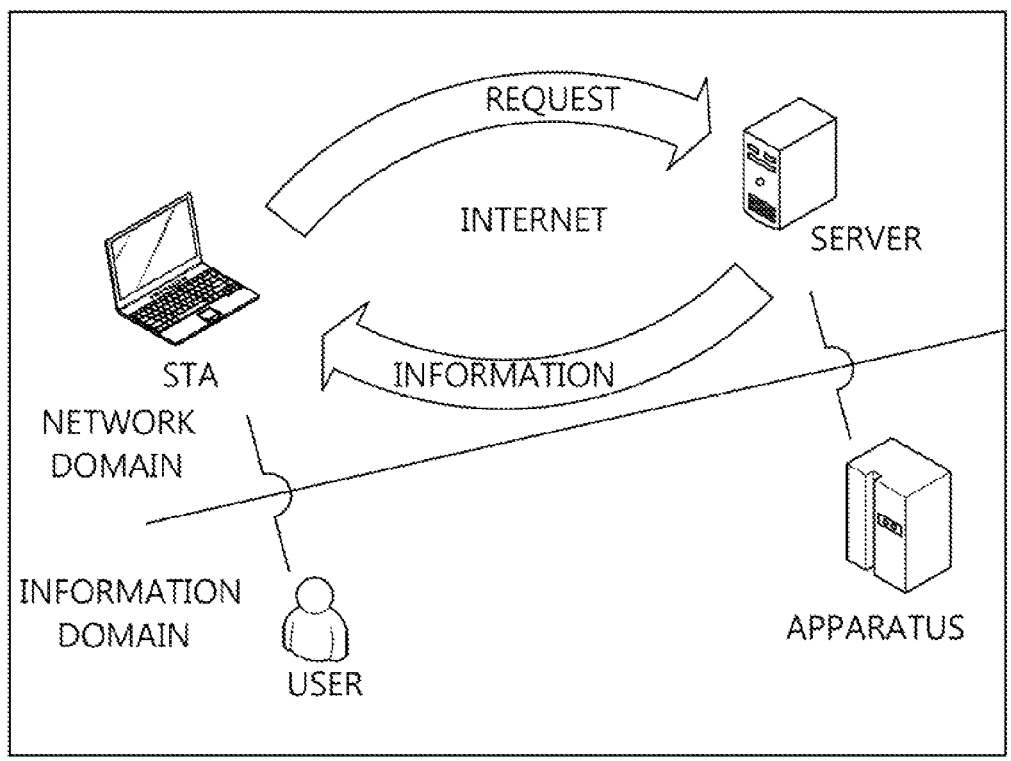
FIG. 2 is a diagram illustrating an existing network model.

FIG. 2 is a diagram illustrating an existing network model. The network model may be divided into a network domain and an information domain.

The network domain indicates physical components constituting an actual network and the relationship thereof. A network structure is diversified, but is expressed in a most general server/client structure. In numerous cases, a client (alternatively, the STA) requests information to a server and the server transmits corresponding information (DATA) to the STA. Such a communication flow is caused because existing communication technologies have been developed based on the downlink.

The information domain indicates principal agents that actually send and receive information and the relationship thereof in terms of information. That is, the client (alternatively, the STA) receives information in the network domain, but the user who uses the STA receives information in the information domain. Similarly, the server may be regarded as a machine that mechanically collects information in the information domain.

However, such a network structure is changed in the M2M.

Figure 3:
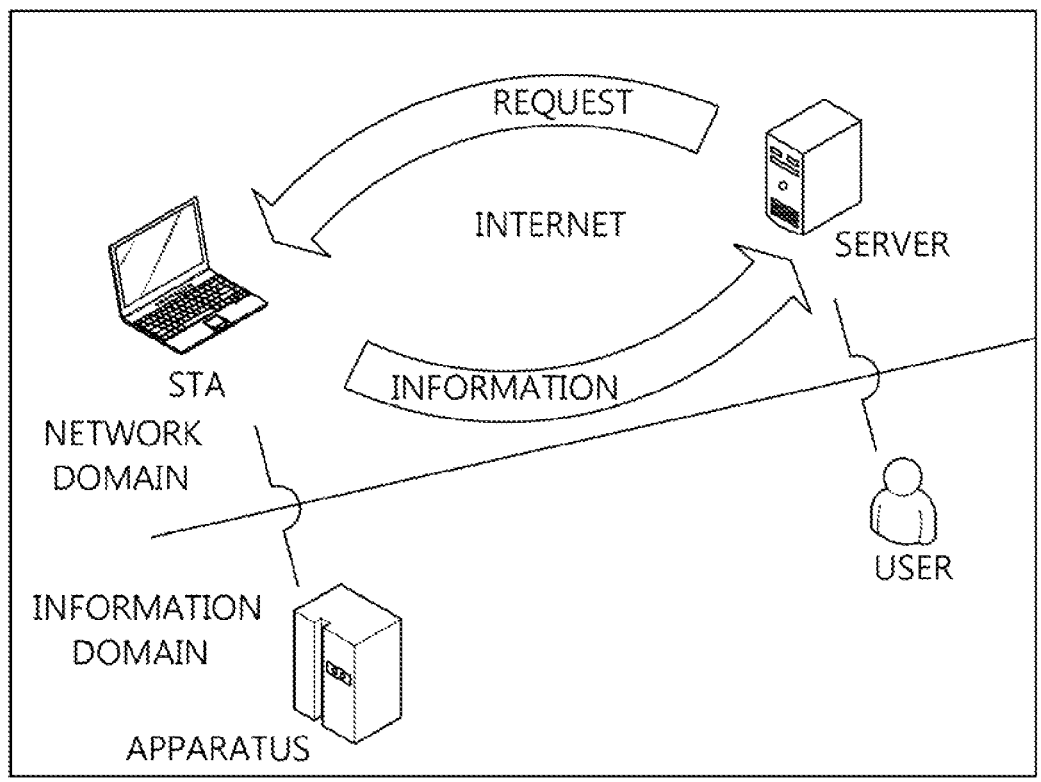
FIG. 3 is a diagram illustrating a network model supporting M2M.

FIG. 3 is a diagram illustrating a network model supporting M2M.

Unlike an illustration of FIG. 2, the STA serves to provide information and the server requests information, in the network domain. In general, the M2M server transmits a measurement instruction message based on a specific condition to the STA and the STA performs measurement according to an instruction to report a result thereof to the M2M server. The server that requests information corresponds to the user and the STA that provides information corresponds to the machine, in the information domain. That is, it may be found that the server accesses the network and the communication flow may be in an opposite direction unlike the existing network model.

In such a viewpoint, a technology associated with network management needs to be considered again in the network supporting the M2M. In the previous network model, since the user is present at the STA side, a network management function is given to even the STA. On the contrary, in the network supporting the M2M, since the STA is enough to provide only information according to an instruction/command, a network management function at the server side needs to be more strengthened than the existing network model.

The STA in the existing system is a user terminal which is directly used/managed by the user. Therefore, an option of the STA is assured and selection by the user is reflected on the STA, which operates depending on the situation. In particular, the STA discovers a neighboring network when the STA operates for the first time, and as a result, an operation of the STA that selects the network to be accessed is entirely up to the STA.

On the contrary, in the M2M supporting network, since the STA is a terminal that collects and provides information, the STA needs to be controlled by a predetermined AP/network. However, a network discovery/selection protocol by the present STA may cause problems described below in the M2M supporting network.

1) Problem in consumption of electric power: In general, the network discovery/selection tends to consume a battery. The reason is that an STA that does not yet find the network repeats the discovery procedure until discovering a specific network all channels. In particular, when a wireless channel situation temporarily deteriorates to thereby fail to sensing a signal or no AP is present in a specific channel, a time required to discover the network may be rapidly increased. Further, when an inappropriate AP is selected, the above process is repeated. The aforementioned existing communication procedures cause additional batter consumption.

The M2M STAs need to consume minimum electric power in order to maintain a long life-span while operating by the battery. Therefore, the additional battery consumption is one of problems to be solved in the M2M supporting network.

2) Problem in wireless resource management: A situation in which M2M supporting network includes too many STAs is assumed. Therefore, an important in terms of wireless resource management is emphasized due to the feature of the wireless communication system. When each of a plurality of STAs uses the active scanning method in order to perform the network discovery/selection function, numerous management frames are exchanged. A management frame is a factor that causes overhead in terms of the network and since the management frame has a low transmission speed and has a substantially large length, wireless resources may be wasted.

3) Problem in network management: When not the AP but the STA performs the network discovery/selection process, data or a control command to be sent to a specific STA that is not associated may not be transmitted.

In order to solve the aforementioned problems, a link establishment method through the network discovery/selection process under an M2M environment having the AP as an execution principal agent will be proposed below. Hereinafter, the AP and/or STA indicates an AP and/or STA as a constituent member of the WLAN system that supports the M2M.

Figure 4:
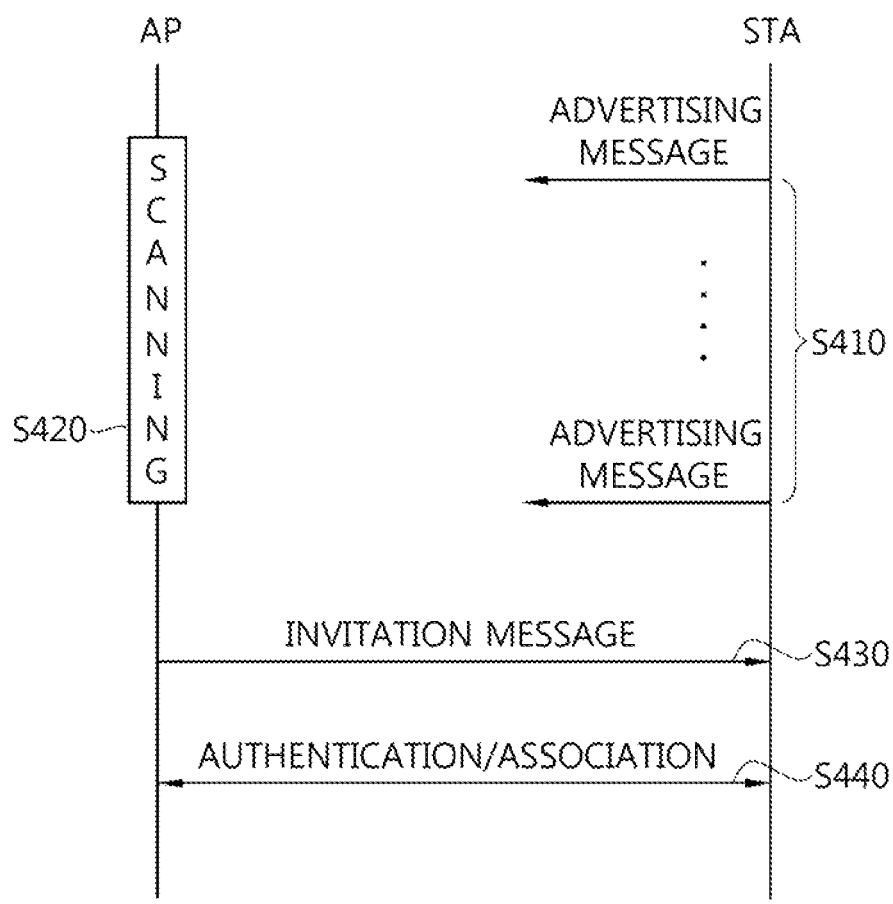
FIG. 4 is a flowchart illustrating a link establishment method according to an exemplary embodiment of the present invention.

FIG. 4 is a flowchart illustrating a link establishment method according to an exemplary embodiment of the present invention.

Referring to FIG. 4, an STA broadcasts an advertising message including information on the STA itself (S410). The advertising message is periodically broadcasted by the STA. The STA waits for an invitation message transmitted an AP within a specific time after transmitting the advertising message. When STA is incapable of receiving the invitation message within the specific time, the STA may operate by entering a doze state in order to reduce electric power. The STA which is operating in the doze state switches to an awake state to broadcast the advertising message at the time of transmitting the advertising message.

In general, STAs that support M2M operates by switching to the doze state during a time period of not transmitting/receiving a wireless signal for power saving. Similarly, the STAs operate by switching to the awake state during a time period of transmitting/receiving the wireless signal. This is referred to as a power save mode administration of the STA. Since the wireless signal may be transmitted/received only during a period when the STA is in the awake, the AP should find information on the power save mode administration of the corresponding STA. Accordingly, the advertising message which the STA periodically broadcasts includes information associated with a sleep interval and a listening duration.

Figure 5:
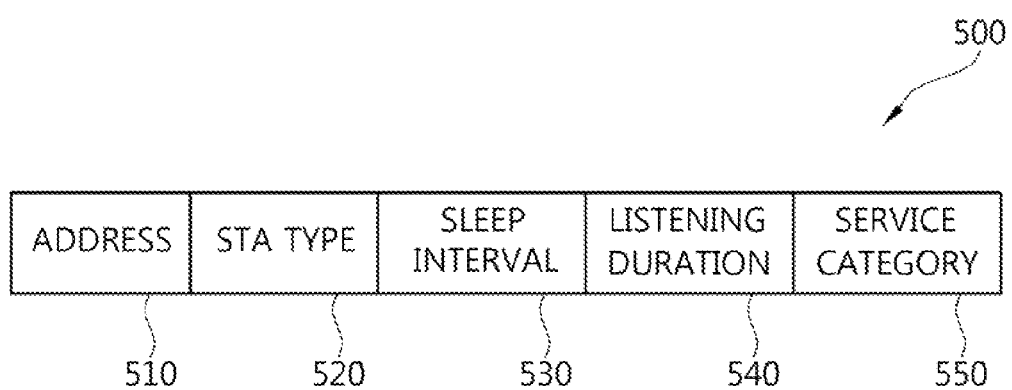
FIG. 5 is a block diagram illustrating a frame format of an advertising message according to an exemplary embodiment of the present invention.

FIG. 5 is a block diagram illustrating a frame format of an advertising message according to an exemplary embodiment of the present invention.

Referring to FIG. 5, an advertising message 500 includes an address field 510, an STA type field 520, a sleep interval field 530, a listening duration field 540, and a service category field 550.

The address field 510 includes address information of the STA that transmits the advertising message 500, for example, MCA address information.

The STA type field 520 indicates a device type of the STA. Since various types of STAs are present in the M2M network, information for distinguishing device types of the respective STAs is required. As one example, it is assumed that a refrigerator and a TV are different types of STAs in a home network. A device type of a communication module embedded in the refrigerator and the device type of the TV are different from each other, but device type indication information included in the STA type field 520 indicates different device types, both STAs may be distinguished. The AP acquires information on a device type of an STA to be associated therewith to thereby manage/control the STA.

The sleep interval field 530 and the listening duration field 540 constitute power save mode administration information of the corresponding STA. The sleep interval field 530 includes information associated with a period when the corresponding STA operates by switching to the doze state and/or the awake state. That is, the sleep interval field 530 may indicate a period when a non-AP STA switches to an awake mode to transmit the advertising message. A specific AP may not transmit an invitation message to the STA that transmits the advertising message to or may not receive a response from the corresponding STA by receiving and analyzing the advertising message. In this case, the AP does not unnecessarily transmit the invitation message but waits until the STA switches to the awake state again to transmit the advertising message based on the sleep interval field 530 to acquire the advertising message again.

The listening duration field 540 includes information on a duration when the STA maintains the awake state at the time of switching to the awake state. When the STA operates in the awake state and does not receive the invitation message from the AP during a duration indicated by the listening duration field 540 from the AP, the STA may operate by switching to the doze state. The AP decides whether the STA is in the awake state based on the listening duration field 540 and when the STA is in the awake state, the AP transmits the invitation message. Otherwise the AP waits until the STA switches to the next awake state.

When the device type of the STA is decided based on the STA type field 520, the service category field 550 includes information on a detailed requirement for supporting a service of the STA of the corresponding device type. The service category field includes information on a type, positional information, delay constraints, minimum rate, a traffic interval, and a security requirement of an application supported by the STA. The AP may transmit a signal for a specific requirement indicated by the service category field 550 of the advertising message transmitted by the STA.

Referring back to FIG. 4, the AP receives the advertising message broadcasted by the STA and the AP scans the STA based on the information included in the advertising message (S420). The scanning performed by the AP may include selecting an STA which needs to be associated with the AP itself. The selection of the STA to be associated may depend on information required by the AP.

When the AP decides the STA to be associated therewith through the scanning procedure, the AP transmits the invitation message to allow the corresponding STA to be associated with the network (S430).

Figure 6:
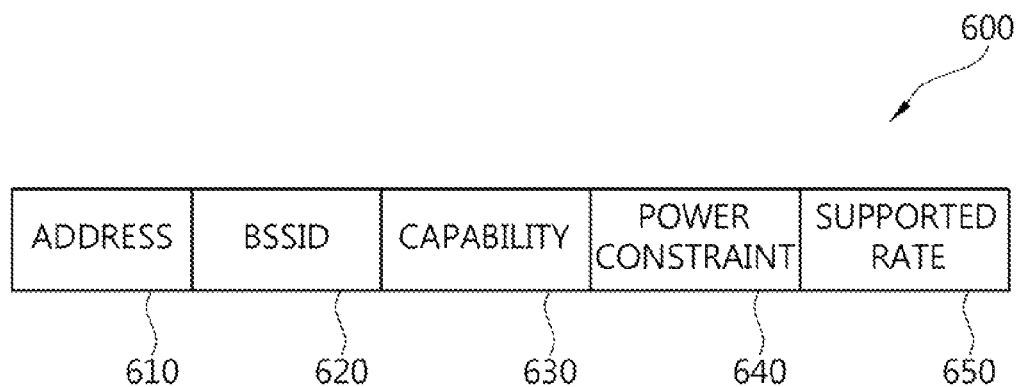
FIG. 6 is a block diagram illustrating a frame format of an invitation message according to an exemplary embodiment of the present invention.

FIG. 6 is a block diagram illustrating a frame format of an invitation message according to an exemplary embodiment of the present invention.

Referring to FIG. 6, an invitation message 600 includes an address field 610, a basic service set (BSS) identifier field 620, a capability field 630, a power constraint field 640, and a supported rate field 650.

The address field 610 may indicate address information of an AP that transmits the invitation message 600, for example, a medium access control (MAC) address. The BSS ID field 620 may include identification information of a BSS based on the AP. The capability field 630 may include information associated with a capability of a WLAN system supported by the AP. The power constraint field 640 may include power constraint information applied to the STA within the BSS based on the AP. The supported rate field includes information indicating data rate supported within the BSS within the AP.

Referring back to FIG. 4, when the STA receives the invitation message from the AP, the STA performs an authentication/association process with the AP and the STA subscribes in the BSS based on the AP while succeeding in the authentication/association process (S440).

The existing method may be applied to the authentication/association of the AP and the STA. The STA may perform an authentication procedure through transmitting an authentication request message to the AP and receiving an authentication response message from the AP. Messages for the authentication procedure may include information associated with a key of the AP and/or STA. When the authentication procedure is completed, the STA may perform the association procedure through transmitting an association request message and receiving an association response message from the AP as a response thereto.

Table 1 below is a diagram illustrating a frame format for the association request message and Table 2 below is a diagram illustrating a frame format for the association response message.

TABLE 1

| Order | Information (length in octet) | Notes |
|---|---|---|
| 1 | Capability (2) | |
| 2 | Listen interval (2) | |
| 3 | SSID (2) | |
| 4 | Supported rates (3-10) | |
| 5 | Extended Supported Rates (3-257) | The Extended Supported Rates element is present if there are more than eight supported rates, and it is optional otherwise. |
| 6 | Power Capability (4-257) | The Power Capability element is present if dot11SpectrumManagementRequired is true or dot11RadioMeasurementActivated is true. |
| 7 | Supported Channels (4-256) | The Supported Channels element is present if dot11SpectrumManagement Required is true and dot11ExtendedChannelSwitchActivated is false. |
| 8 | RSN (36-256) | The RSN element is present if dot11RSNAActivated set to true. |
| 9 | QoS Capability (3) | The QoS Capability element is present if dot11QoSOption-Implemented is true. |
| 10 | RM Enabled Capabilities (7) | RM Enabled Capabilities element is present if dot11RadioMeasurementActivated is true. |

TABLE 1-continued

| Order | Information (length in octet) | Notes |
|---|---|---|
| 11 | Mobility domain | The MDE is present in an Association Reqeust frame if dot11FastBSStransitionActivated is true and if the frame is being sent to an AP that advertised its FT capability in the MDE in its Beacon or Probe Response frame (i.e., AP also has dot11FastBSSTransitionActivated set to true). |
| 12 | Supported Operating Classes (4-255) | The Supported Operating Classes element is present if dot11ExtededChannelSwitchActivated is true. |
| 13 | HT Capabilities (28) | The HT Capabilities element is present when dot11HighThroughputOptionImplemented attribute is true. |
| 14 | 20/40 BSS Coexistence (3) | The 20/40 BSS Coexistence element is optionally present when the dot112040BSSCoexistenceManagementSupprot attribute is true. |
| 15 | Extended Capabilities (3) | The Extended Capabilities element is optionally present if any of the fields in this element are nonzero. |
| Last | Vendor Specific (3-257) | One or more vendor-specific elements are optionally present. Theses elements follow all other elements. |

TABLE 2

| Order | Information | Notes |
|---|---|---|
| 1 | Capability | |
| 2 | Status code | |
| 3 | AID | |
| 4 | Supported rates | |
| 5 | Extended Supported Rates | The Extended Supported Rates element is present if there are more than eight supported rates, and it is optional otherwise. |
| 6 | EDCA Parameter Set | |
| 7 | RCPI | The RCPI element is present if dot11RMRCPIMeasurementActivated is true. |
| 8 | RSNI | The RSNI element is present if dot11RMRSNIMeasurementActivated is true. |
| 9 | RM Enabled Capabilities | RM Enabled Capabilities element is present if dot11RadioMeasurementActivated is true. |
| 10 | Mobility domain | An MDE is present in an Association Response frame when dot11FastBSSTransitionActivated is true and this frame is a response to an Association Request frame that contained an MED (i.e., an FT initial mobility domain association exchange). |
| 11 | Fast BSS transition | A Fast BSS Transition element is present in an Association Response frame when dot11FastBSSTransitionActivated is ture, dot11RSNAActivated is true and this frame is response to an AssociationRequest frame that contained an MDE (i.e., an FT initial mobility domain association exchange in an RSN). |
| 12 | DSE registered location | The DSE Registered Location element is present if dot11LCIDSERequired is true. |
| 13 | Timeout Interval (Association Comeback time) | A Timeout Interval element contaning the Association Comeback time is present when dot11RSNAActivated is true, dot11RSNAProtectedManagementFramesAcivated is true and the association request is rejected with a status code 30. |
| 14 | HT Capabilities | The HT Capabilities element is present when dot11HighThroughputOptionImplemented attribute is true. |
| 15 | HT Operation | The HT Operation element is included by an AP when dot11HighThroughputOptionImplemented attribute is ture. |
| 16 | 20/40 BSS Coexistance | The 20/40 BSS Coexistence element is optionally present when the dot112040BSSCoexistenceManagementSupprot attribute is true. |
| 17 | Overlapping BSS Scan Parameters | The Overlapping BSS Scan Parameters element is optionally present if the dot11FortyMHzOptionImplemented attribute is true. |
| 18 | Extended Capabilities | The Extended Capabilities element is optionally present if any of the fields in this element are nonzero. |
| Last | Vendor Specific | One or more vendor-specific elements are optionally present. Theses elements follow all other elements. |

The STA performs the existing authentication/association process as a principal agent. The STA requests authentication/association and the AP provides a response thereto. However, in the present invention, the AP more preferably performs the link establishment method as the principal agent. Further, since basic information of the BSS based on the AP is transmitted by the invitation message, a 2-way handshake mode may be a waste.

Figure 7:
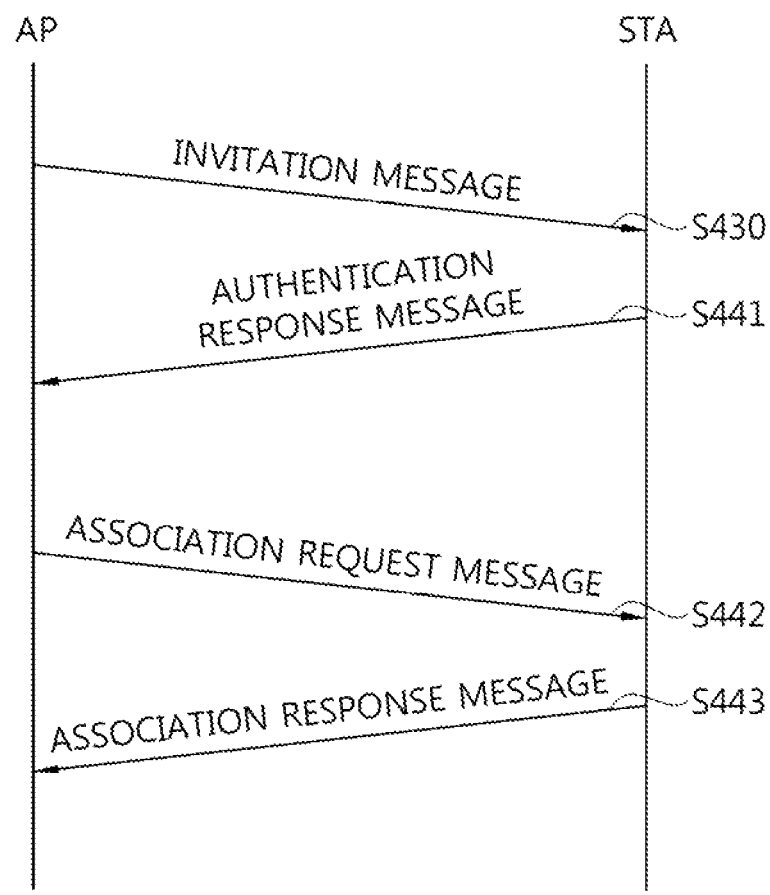
FIG. 7 is a flowchart illustrating an authentication and association method according to an exemplary embodiment of the present invention.

FIG. 7 is a flowchart illustrating an authentication and association method according to an exemplary embodiment of the present invention.

Referring to FIG. 7, the STA receives the invitation message transmitted by the AP (S430) and transmits the authentication response message to the AP (S441). The authentication request/response process of the existing 2-way handshake mode is omitted and the STA transmits the association response message to the AP as the response to the invitation message, and as a result, the authentication procedure is completed (S441).

The AP that receives the authentication response message transmits the association request message to the STA (S442) and the STA transmits the association response message to the AP as the response thereto (S443).

When the authentication/association method of FIG. 7 is applied, information on parameters and a key required for an authentication algorithm may be added to the invitation message. The authentication response message may sufficiently serve to acknowledge reception. Information required for association is added to even the association request message. Since most association-related information illustrated in Table 1 and/or Table 2, which is included in the invitation message may be additionally transmitted, information such as a quality of service (QoS), a capability, mobility information, and the like may be additionally included in the association request message.

In the link establishment method based on the exemplary embodiment of FIGS. 4 to 7, effects in link establishment below may occur.

1) Reduction in consumption of electric power: Unlike the related art, the STA may simply notify information thereon without scanning the AP/network periodically and periodically operate in the doze state during a specific time period. Since analysis of a received signal and channel switching are not needed to discover the network, power consumption by the STA may be reduced.

2) Strengthening of network management of AP: Since the AP may select the STA to be associated with the AP itself based on the information on the device type field and the service category field of the advertising message transmitted by the STA, an unnecessary association request by the STA may be prevented. Further, the AP may actively control the number of associated STAs by applying a unique admission control technique.

3) Efficient wireless resource management: When the AP is not present in a specific channel, all STAs may perform an unnecessary channel scanning operation in the corresponding channel. In particular, numerals STAs transmit a probe request frame for active scanning, and as a result, the wireless resource may be wasted. In particular, an unnecessary collision among the STAs may occur. When additional channels are many, the power consumption may be large. On the contrary, according to the exemplary embodiment, since the STA may transmit the advertising message including information thereon only in a channel which the STA itself will use, channel management may be efficiently achieved.

Meanwhile, a case in which a specific STA is associated with not a designated AP but another AP may occur. The case will be referred by using an example of a WLAN environment illustrated in FIG. 7.

Figure 8:
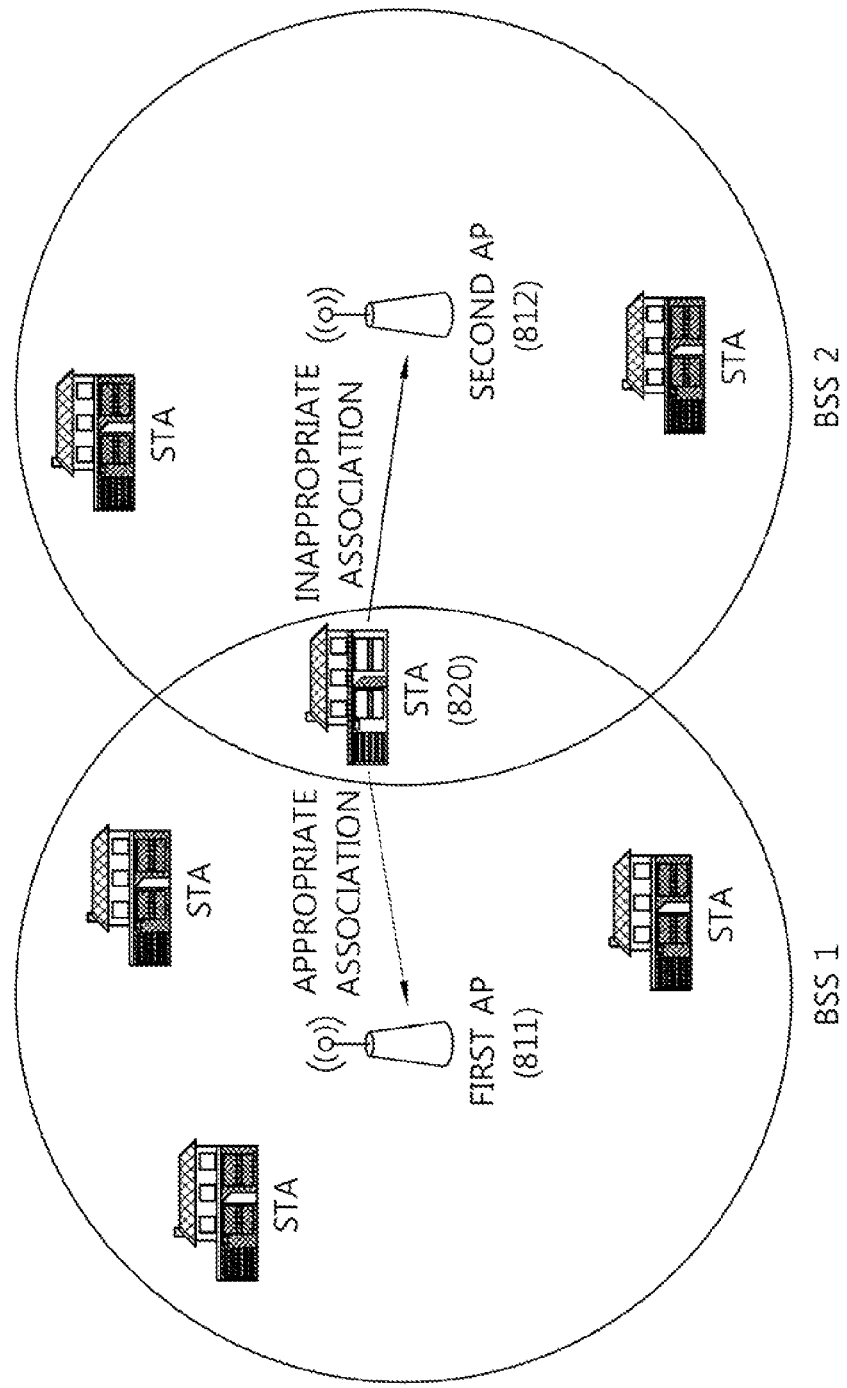
FIG. 8 illustrates one example of a WLAN environment according to an exemplary embodiment of the present invention.

FIG. 8 illustrates one example of a WLAN environment according to an exemplary embodiment of the present invention.

Referring to FIG. 8, an STA 820 is simultaneously present in coverages of a first BSS by a first AP 811 and a second BSS by a second AP 812. In this case, there is a possibility that the STA 820 will be associated with the first AP 811 or the second AP 812. However, it is assumed that the association of the STA 820 with the first AP 811 is appropriate association and the association of the STA 820 with the second AP 812 is inappropriate association.

A problem occurs when the STA 820 is installed, and as a result, the STA 820 may be associated with not the first AP 811 which is previously designated but the second AP 812. Alternatively, a designated AP is changed due to a problem which occurs in the network, but the STA 820 may maintain the association with the existing second AP 812 while not yet notifying the change.

Under such a situation, data or a control program which the first AP 811 will send to the STA 820 may be generated. The reason is that the user or a network manager may transmit related information while transferring a measurement/operation command to the STA 820. Meanwhile, if the STA 820 is not associated with a corresponding AP at the time when the first AP 811 transfers the command to the STA 820, the information is disabled to be transmitted. If the first AP 811 and the second AP 812 may send and receive information, the problem may be solved by handing over the STA 820 from the second AP 812 to the first AP 811. However, in the WLAN system that supports the M2M, since there is a high possibility that different networks will be formed depending on a supported application, the information may not be exchanged between the APs.

The problem which may occur in the WLAN environment illustrated in FIG. 8 may be prevented when the network discovery/selection method using the AP as the principal agent is applied. Further, even though such an environment occurs, the STA is instructed to perform authentication/association to induce the STA to subscribe in an appropriate AP.

Even though the STA itself is associated with the AP, the STA may not find whether the corresponding AP is appropriate, the STA periodically broadcasts the advertising message. The AP verifies whether the STA needs to be associated with the AP itself by receiving the advertising message transmitted from the STA and when the STA is the STA to be associated with the AP itself, the AP transmits the invitation message. In this case, the AP may transmit the invitation message while the STA is in the awake state, based on information related to the power save mode of the STA included in the advertising message. After the STA that receives the invitation message recognizes that the STA itself is associated with an inappropriate AP at present, the STA attempts association with the appropriate AP in accordance with the invitation message.

Meanwhile, in the WLAN system that supports the M2M, a frequency in which the STA does not discover the AP may become high. The network discovery function needs to be executed all channels which the STA and/or AP may use. However, in the M2M environment that supports the use of a narrow bandwidth, since the number of usable channels is large, performing the network discovery operation in each channel may cause a waste in terms of efficiency of electric power for the STA. When a function of the STA is limited in order to increase an operating life-span of the STA, the network discovery function may be reduced and it may be difficult for the STA to normally discover the AP. Under such an environment, it may be efficient that the AP which has a relatively superior function and a small burden of power consumption discovers the STA by performing the discovery function with respect to all channels and thereafter, starts the authentication/association process.

Figure 9:
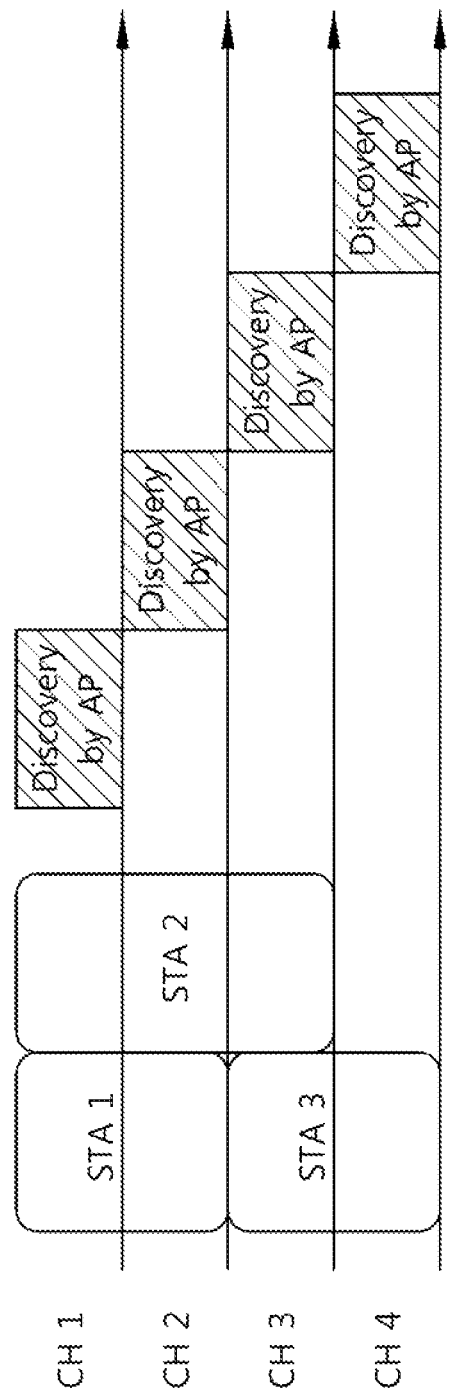
FIG. 9 is a diagram illustrating an example of the use of a channel of a WLAN environment according to the exemplary embodiment of the present invention.

FIG. 9 is a diagram illustrating an example of the use of a channel of a WLAN environment according to the exemplary embodiment of the present invention.

Referring to FIG. 9, the STA selects at least one of the usable channels to repeatedly transmit the advertising message in the corresponding channel. An STA1, an STA2, and an STA3 transmit the advertising message a CH1 and/or a CH2, a CH3 and/or a CH4, and at least one channel of the CH1 to the CH3, respectively.

The AP attempts to receive the advertising message by repeatedly performing the discovery function while changing the channel. If the advertising message is received in a specific channel, the AP temporarily stops the channel changing and analyzes the message. When the STA that transmits the message is decided as the STA to be associated with the AP itself, the AP transmits the invitation message to the corresponding STA to start the authentication/association process. When the authentication/association process with the corresponding STA is completed, the AP repeats the STA discovery operation by changing the channel again. Meanwhile, when the corresponding STA is not the STA to be associated with the AP itself, the AP performs the STA discovery operation with respect to another channel.

Additionally, even when the AP has mobility, the link establishment method according to the exemplary embodiment of the present invention may be applied.

Figure 10:
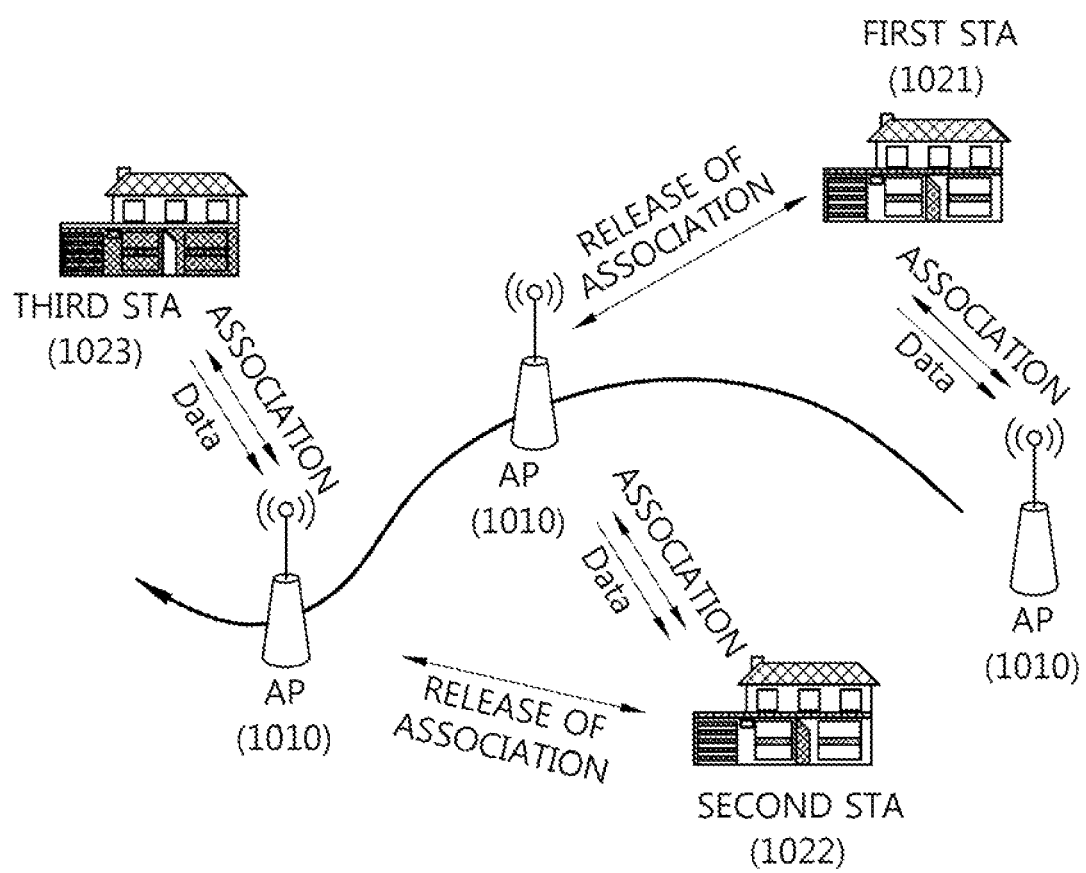
FIG. 10 illustrates another example of the WLAN environment according to the exemplary embodiment of the present invention.

FIG. 10 illustrates another example of the WLAN environment according to the exemplary embodiment of the present invention. In the WLAN environment, it is assumed that STAs are deployed and the AP collects information on the STAs while keeping the mobility.

Since the AP keeps the mobility, the AP is not always present within a wireless signal transmission/reception coverage of the STA. Therefore, it is inefficient in terms of wireless resource and power management that the STA principally performs the network discovery/selection process. Further, since it is sufficient that the AP is associated with a required station depending on a step of collecting information, it may be more efficient that the AP selects the STA.

The STA periodically transmits the advertising message. The AP having the mobility receives advertising messages transmitted from a plurality of STAs and analyzes the received advertising messages. The AP decides the order of STAs to be associated, based on the advertising messages. The association order may be decided based on positional information of the STA or received power. In this example, it is assumed that the association order is decided as the order of a first STA 1021, a second STA 1022, and a third STA 1023.

Referring to FIG. 10, an AP 1010 starts the authentication/association procedure by transmitting the invitation messages to the STA in accordance with the association order and transmits/receives data after association. The AP releases association with an STA in which data exchange is terminated and may update the association order by receiving the advertising messages transmitted from other STAs.

The AP 1010 is first associated with the first STA 1021. When data exchange with the first STA 1021 is completed, the AP 1010 releases association and is associated with the second STA 1022. When data exchange with the second STA 1022 is completed, the AP 1010 releases the association and is associated with the third STA 1023. Thereafter, the AP exchanges data with the third STA 1020 and when the data exchange is completed, the AP releases the association. Thereafter, the AP may receive the advertising messages transmitted from the STAs, decide the STA association order again, and repeat the aforementioned process.

Figure 11:
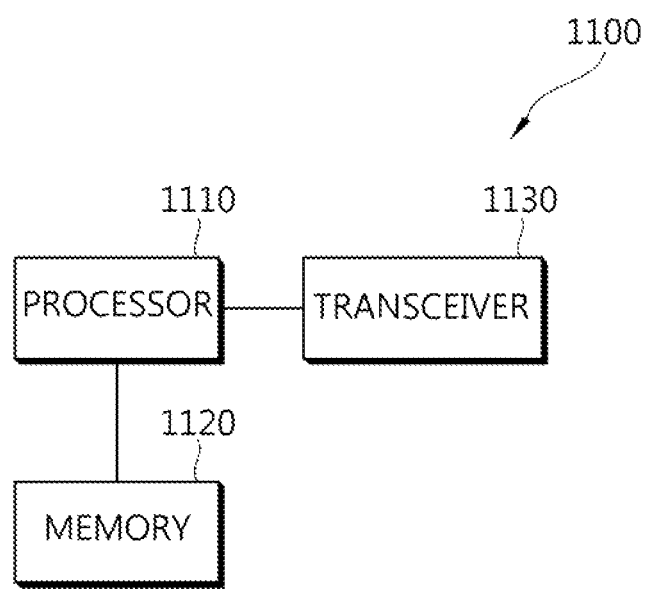
FIG. 11 is a block diagram illustrating a wireless apparatus according to an exemplary embodiment of the present invention.

FIG. 11 is a block diagram illustrating a wireless apparatus according to the exemplary embodiment of the present invention. The wireless apparatus may be the AP or the STA.

Referring to FIG. 11, a wireless apparatus 1100 includes a processor 1110, a memory 1120, and a transceiver 1130. The transceiver 1130 transmits/receive a wireless signal and implements a physical layer of IEEE 802.11. The processor 1110 is functionally connected with the transceiver 1130 to implement an MAC layer and the physical layer of IEEE 802.11. The processor 1110 may be set to implement the exemplary embodiment of the present invention with reference to FIGS. 2 to 10.

The processor 1110 and/or transceiver 1130 may include an application-specific integrated circuit (ASIC), other chipsets, a logic circuit, and/or a data processing device. The memory 1120 may include a read-only memory (ROM), a random access memory (RAM), a flash memory, a memory card, a storage medium, and/or other storage devices. When the exemplary embodiments are implemented by software, the aforementioned technique may be implemented by modules (a processing, a function, and the like) that perform the aforementioned functions. The modules are stored in the memory 1120 and may be executed by the processor 1110. The memory 1120 may be present inside or outside the processor 1110 and may be connected with the processor 1110 by various known means.

The exemplary embodiments described above in detail are just examples for showing the spirit of the present invention and it should not be appreciated that the spirit of the present invention is limited to the exemplary embodiments. The protection scope of the present invention is specified by claims of the present invention to be described below.

The invention claimed is:

1. A method for advertising services in a wireless local area network, the method comprising:
   repeatedly transmitting, by a first device via first channel, a first advertising message for advertising an availability of the first device's service to a second device;
   repeatedly transmitting, by the first device via a second channel, a second advertising message for advertising the availability of the first device's service to the second device, the second channel having a frequency band different from a frequency band of the first channel,
   wherein each of the first and second advertising messages includes a service category field, a device type field and at least one availability field, the device type field indicating whether the first device is a first type device or a second type device, the service category field indicating at least one service available to the first device to make the first device's service discoverable for the second device, and the availability field indicating at least one interval during which a corresponding advertising message is repeatedly transmitted via a corresponding channel; and
   establishing a data connection by the first device with the second device based on one of the first or second advertising message.

2. The method of claim 1, further comprising:
   performing, by the first device, a synchronization with the second device before transmitting the first and second advertising messages.

3. The method of claim 1, further comprising:
selecting, by the first device, the first and second channels from among a plurality of channels available to the first device.

4. The method of claim 1, further comprising:
receiving, by the first device from the second device, an invitation message to request the data connection; and
transmitting, by the first device to the second device, an acceptance message to establish the data connection.

5. The method of claim 1, wherein the first and second advertising messages are simultaneously transmitted.

6. The method of claim 1, wherein the first and second advertising messages are not simultaneously transmitted.

7. The method of claim 1, wherein the availability field comprises a sleep interval field or a listening duration field or both the sleep interval field and the listening duration field.

8. The method of claim 1, wherein the service category field includes information on a type, positional information, delay constraints, minimum rate, a traffic interval, or a security requirement of an application supported by the first device.

9. The method of claim 1, wherein the first device is a first station.

10. The method of claim 1, wherein the second device is an access point.

11. A device configured for advertising services in a wireless local area network, the device comprising:
a transceiver configured to transmit and receive radio signals; and
a processor operatively coupled with the transceiver and configured to:
repeatedly transmit, via first channel, a first advertising message for advertising an availability of the device's service to a peer device;
repeatedly transmit, via a second channel, a second advertising message for advertising the availability of the device's service to the peer device, the second channel having a frequency band different from a frequency band of the first channel,
wherein each of the first and second advertising messages includes a service category field, a device type field and at least one availability field, the device type field indicating whether the device is a first type device or a second type device, the service category field indicating at least one service available to the device to make the device's service discoverable for the peer device, and the availability field indicating at least one interval during which a corresponding advertising message is repeatedly transmitted via a corresponding channel; and
establish a data connection with the peer device based on one of the first or second advertising message.

12. The device of claim 11, wherein the availability field comprises a sleep interval field or a listening duration field or both the sleep interval field and the listening duration field.

13. The device of claim 11, wherein the service category field includes information on a type, positional information, delay constraints, minimum rate, a traffic interval, or a security requirement of an application supported by the device.

14. The device of claim 11, wherein the peer device is an access point.

* * * * *